(12) United States Patent
Coppola et al.

(10) Patent No.: US 7,467,146 B2
(45) Date of Patent: Dec. 16, 2008

(54) SYSTEM, METHOD AND PROGRAM PRODUCT FOR DETERMINING WHETHER A WEB PAGE RETURNED TO A WEB BROWSER IS A REDIRECTED WEB PAGE

(75) Inventors: Gregory Frank Coppola, Monroe, CT (US); Brian Patrick Singer, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 11/122,663

(22) Filed: May 5, 2005

(65) Prior Publication Data
US 2006/0253454 A1    Nov. 9, 2006

(51) Int. Cl.
*G06F 15/16* (2006.01)
(52) U.S. Cl. .................... 707/10; 707/10; 707/101; 709/211; 709/219; 709/222; 709/229; 715/716; 715/725
(58) Field of Classification Search .............. 707/1, 707/10; 705/1, 26, 27; 709/203–211, 219, 709/222, 229; 715/716–725
See application file for complete search history.

(56) References Cited

U.S. PATENT DOCUMENTS

| | | | | |
|---|---|---|---|---|
| 5,712,979 A * | 1/1998 | Graber et al. | ............... | 709/224 |
| 5,941,944 A * | 8/1999 | Messerly | ............. | 709/203 |
| 6,269,362 B1 * | 7/2001 | Broder et al. | ................. | 707/4 |
| 6,401,077 B1 * | 6/2002 | Godden et al. | ................ | 705/26 |
| 6,438,125 B1 | 8/2002 | Brothers | .................... | 370/352 |
| 6,449,765 B1 | 9/2002 | Ballard | .................... | 717/174 |
| 6,470,027 B1 * | 10/2002 | Birrell, Jr. | .................. | 370/465 |
| 7,203,684 B2 * | 4/2007 | Carobus et al. | ............... | 707/10 |
| 7,237,030 B2 * | 6/2007 | Chakraborty et al. | ....... | 709/229 |
| 2005/0015512 A1 | 1/2005 | Kale et al. | ................... | 709/245 |
| 2005/0165800 A1 * | 7/2005 | Fontoura et al. | ............ | 707/100 |

OTHER PUBLICATIONS

Michael K. Reiter, Detecting Hit Shaving in Click-Through Payment Schemes,Proceedings of the 3rd USENIX Workshop on Electronic Commerce, Boston, Massachusetts, Aug. 31-Sep. 3, 1998.*
Jeffrey Bardzell, Creating a DHTML Interaction with Fireworks and Dreamweaver.*

* cited by examiner

*Primary Examiner*—Jean M. Corrielus
*Assistant Examiner*—Augustine Obisesan
(74) *Attorney, Agent, or Firm*—Christopher & Welsberg, P.A.

(57) ABSTRACT

System, method and program product determine whether a first web page returned to a web browser is a redirected web page. A dummy URL is created by appending one or more characters to a URL of the first web page. The one or more characters are chosen such that the dummy URL is likely to elicit a redirected web page. The request for the dummy URL is sent. A second web page is received in response to the request. The content of the second web page is compared to content of the first web page to determine if the first web page is a redirected web page. If the content of the second web page matches the content of the first web page, a record is made indicating that the first web page is a redirected web page.

20 Claims, 4 Drawing Sheets

SYSTEM, METHOD AND PROGRAM PRODUCT FOR DETERMINING WHETHER A WEB PAGE RETURNED TO A WEB BROWSER IS A REDIRECTED WEB PAGE

BACKGROUND

The present invention relates generally to the World Wide Web, and more particularly to web browsers or other such programs.

The World Wide Web ("WWW") is well known today. Users of client computers with web browsers request web pages by specifying a URL, either by typing the URL into an address field or selecting a link for a URL. Typically, the user requests the web page using HTTP. Web pages are often a user interface to an application hosted by a server and contain information, such as product information, related to the application. Such web pages often include links to access other web pages or invoke services of the application. Other web pages are merely informational, and do not provide an operational interface to any application.

In response to a user request for a web page (where the user request specifies a URL), the user's web browser obtains from a domain name server ("DNS") an IP address of a server and application on the server represented by the URL. Then the web browser forwards the client request for the web page to the (IP address of the) server/application. In response, the requested application on the server returns the requested web page, and a return code of "2xx" indicating that the requested web page was successfully located and returned.

Occasionally, the server or application addressed by the user-specified URL redirects the user request to another server and/or application which returns a "redirected" web page (not the one represented by the user-specified URL). For example, a user may request a web page for a presumed URL based on a generic product name, and a proxy server listed in a domain name server as responsible for that URL will redirect that request to another server and application which provides information or services relating to the generic product. As another example, a vulnerability scanning tool can simulate requests made by a person outside of a firewall or an enterprise being tested to determine if the person can access sensitive web pages from an application within the firewall or enterprise being tested. If so, this represents a security "hole". If not, the server and application addressed by the tool will redirect the request to a default URL which returns a "Sorry, Page Not Found" web page and a return code other than "2xx" to indicate that the returned page was not the one requested. As another example, if a hyperlink requested by a user is not functioning, the server executing the connection may redirect the user to a web page indicating a request was not successful. As another example, a load balancer or network dispatcher which receives a user request for a URL that does not exist or is not accessible may redirect the user request to a default "page not found" web page.

When a server returns a web page other than the one requested by the user, i.e. other than the one represented by the user-specified URL, the server typically provides with the web page a return code other then a "2xx". An RFC2068 industry standard defines five classifications for HTTP return codes: A "1xx" return code means that the server to which the request was sent is processing the request. A "2xx" return code means that the request was successfully received, understood and accepted. A "3xx" return code means that the request was redirected, and a user must take further action to complete the request such as to wait or to select another link on a redirection web page. A "4xx" return code means a client error such as bad syntax, and cannot be fulfilled. A "5xx" return code means a server error such that the server failed to fulfill an apparently valid request. However, the application which returns the redirected web page may be programmed to return a different return code for a variety of reasons. For example, the application which returns the redirected web page with the misleading return code may want to abstract or conceal the fact that the user request was redirected or may have a valid security reason for concealing the redirection. In many cases, the redirected web page does not indicate anywhere else in the web page that the web page is redirected. In other cases, the application which returns the redirected web page may be programmed to return a web page such as illustrated in FIG. 1 which does not include the proper "404" return code, but clearly states in text that the requested web page was not found. Even though this web page indicates in text that the web page was not found, if the requester is a program tool looking for a return code, then the program tool will not recognize this web page as redirected.

There are various situations where the user needs to know that the web page which was returned was not the one requested. In some of these cases the "user" is a person, and in other cases the "user" is a program executing on the user's workstation. For example, consider when the foregoing vulnerability scanning tool simulates requests made by a person, and the application addressed by the tool recognizes the tool as not authorized to access the web page. In such a case, instead of returning the sensitive web page, the addressed application redirects the request to a default application which returns a "Sorry, Page Not Found" web page. If the default application does not return the industry standard "404" code (representing "page not found"), the vulnerability scanning tool may interpret the redirected web page as the one requested by the tool, and conclude that the sensitive web page was returned and a "hole" exists in the security system.

FIG. 2 illustrates another type of known redirected web page. The user-requested application has redirected the user request to a known "time-out" application (because the user's connection to the user-requested application has timed-out). The time-out application returns a redirected web page requesting the user to logon again, instead of the web page to interface to the requested application. Even though this is a redirected web page, the "time-out" application included a "252" (non-redirected) status return code in the URL field. Consequently, if the "user" is the foregoing vulnerability scanning tool, the tool may interpret this web page as the one originally requested by the tool, calculate that the web page was returned after the expiration of the time-out period, and conclude that a "hole" exists in the security system.

An object of the present invention is to enable a web browser or associated program to better detect when a user request for a web page has been redirected.

SUMMARY

The present invention advantageously provides a system, method and program product for determining if a first web page returned to a web browser is a redirected web page.

In accordance one aspect of the present invention, a method is provided for determining whether a first web page returned to a web browser is a redirected web page. A dummy URL is created by appending one or more characters to a URL of the first web page. The one or more characters are chosen such that the dummy URL is likely to elicit a redirected web page. The request for the dummy URL is sent. A second web page is received in response to the request. If the content of the second web page matches the content of the first web page, a record is made indicating that the first web page is a redirected web page.

In accordance another aspect of the present invention, a system for determining whether a first page returned to a web browser is a redirected web page includes a processor. The processor is configured to create a dummy URL by appending one or more characters to a URL of the first web page. The one or more characters are chosen such that the dummy URL is likely to elicit a redirected web page. A request for the dummy URL is sent and a second web page is received in response to the request. The content of the second web page is compared to the content of the first web page. If the content of the second web page matches the content of the first web page, a record is made that the first web page is a redirected web page.

In accordance with yet another aspect of the present invention, a computer program product for determining whether a first web page returned to a web browser is a redirected web page includes program instructions stored on a computer readable medium. The first program instructions create a dummy URL by appending one or more characters to a URL of the first web page. The one or more characters are chosen such that said dummy URL is likely to elicit a redirected web page. The second program instructions initiate sending of a request for the dummy URL. The third program instructions fetch a second web page received in response to the request. Fourth program instructions compare content of the second web page to content of the first web page. If the content of the second web page matches the content of the first web page, fifth program instructions make a record indicating that the first web page is a redirected web page.

DETAILED DESCRIPTION OF THE PREFERRED EMBODIMENTS

Figure 1:
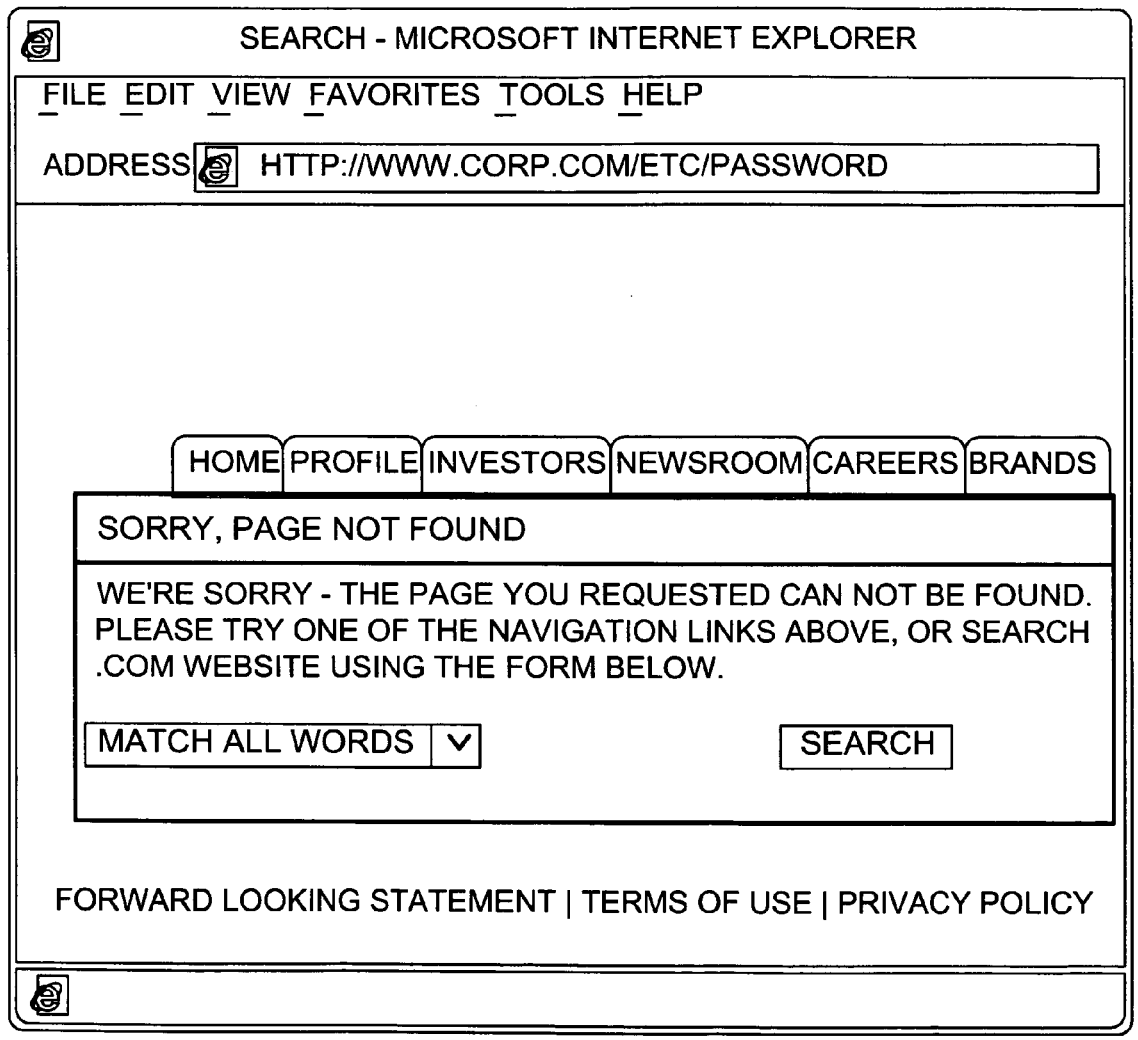
FIG. 1 is a redirected web page according to the Prior Art.
Figure 2:
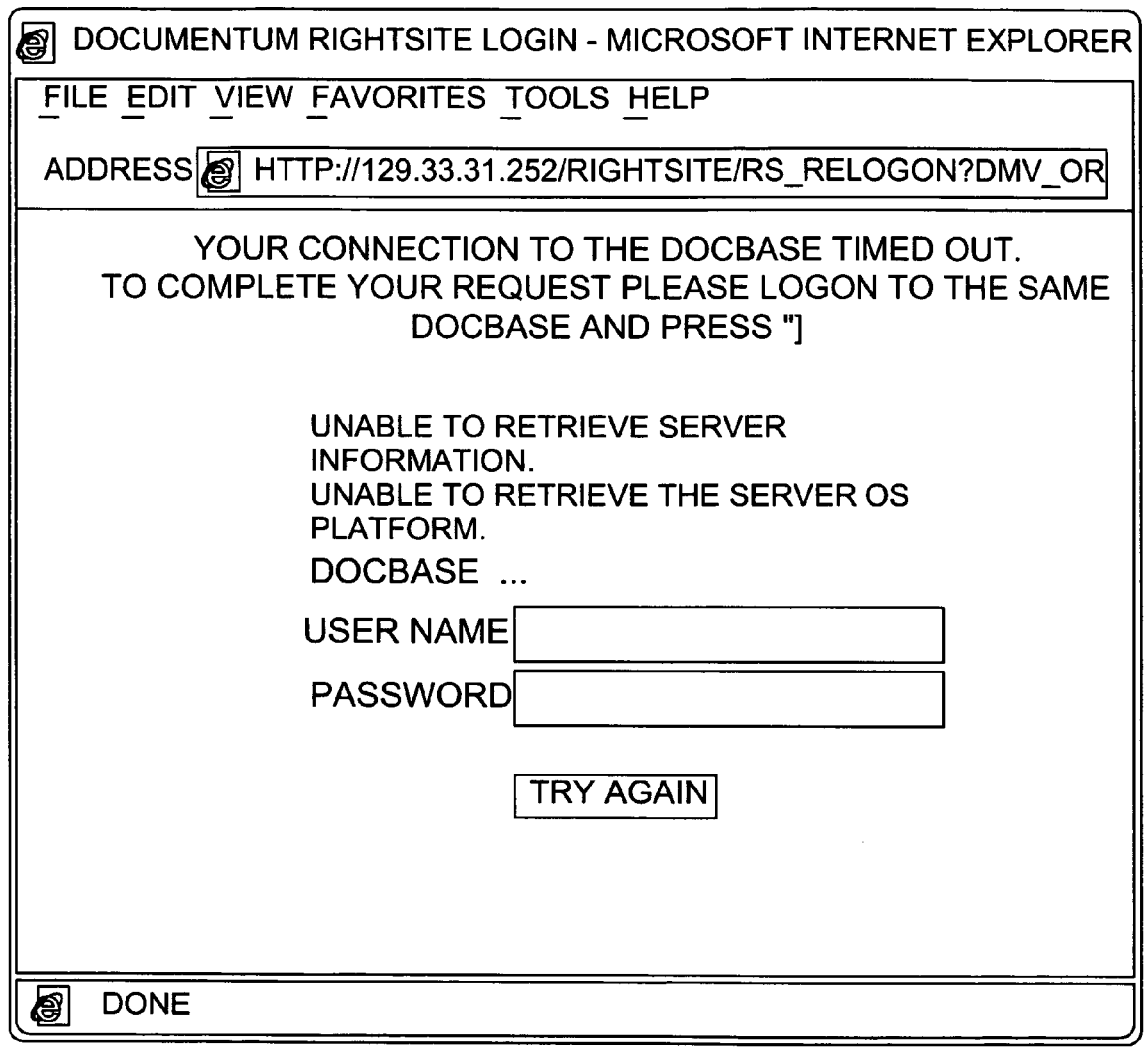
FIG. 2 is another redirected web page according to the Prior Art.
Figure 3:
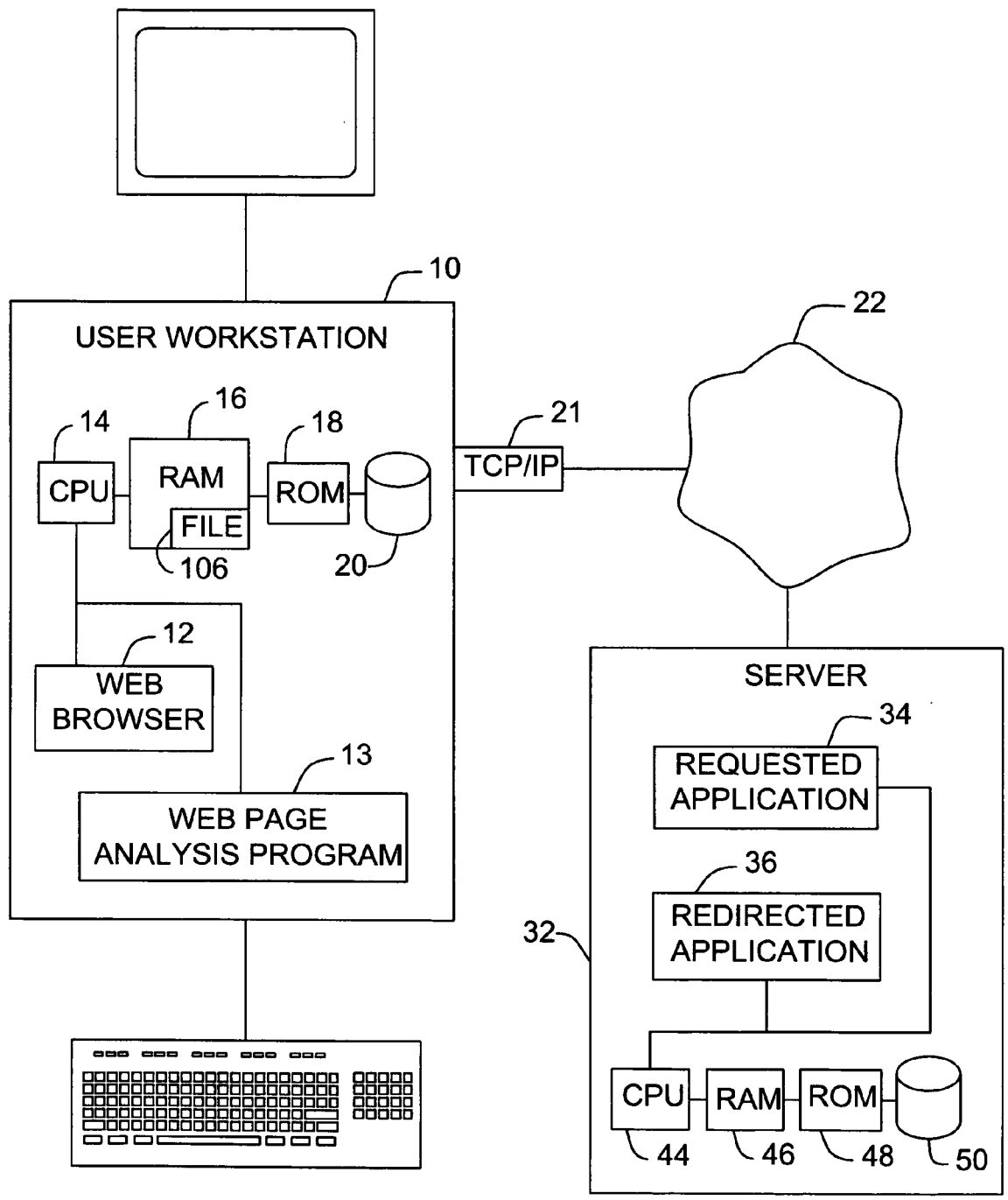
FIG. 3 is a block diagram of a user workstation which includes a web browser according to the prior art, and a web page analysis program according to the present invention.

The present invention will now be described in detail with reference to the figures. FIG. 3 illustrates a user's workstation 10 which includes a web browser 12 such as Microsoft Explorer or Netscape Navigator web browser. Web browser 12 includes the known functions of requesting web pages based on a user-specified URL and receiving and displaying the returned web pages. Workstation 10 also includes a web page analysis program 13 according to the present invention to determine whether the returned web page is the one requested by the user or whether the returned web page is instead a redirected web page. Workstation 10 also includes a known CPU 14 to execute web browser 12 and web analysis program 13, a RAM 16, a ROM 18, disk storage 20 and a TCP/IP interface 21 to the Internet 22. Workstation 10 is coupled via Internet 22 to a server 32. Server 32 includes a known CPU 44, RAM 46, ROM 48 and disk storage 50. CPU 44 executes an application program 34 requested by a user of workstation 10. The user of workstation 10 may request a web page from application 34 by specifying a URL representing application 34 and the web page. Server 32 also includes a redirected application program 36 which supplies to the user at workstation 10 a redirected web page, when application 34 redirects the user request to application program 36. There are many possible reasons why application 34 redirects the user request to application 36. For example, the user may have requested an application by a generic name, and there is no such application at the user-specified URL. As other examples, the user may have requested a sensitive web page which the user is not allowed to access, or the user's session with the user-specified application may have timed-out. The reason for the redirection is not part of the present invention.

Figure 4:
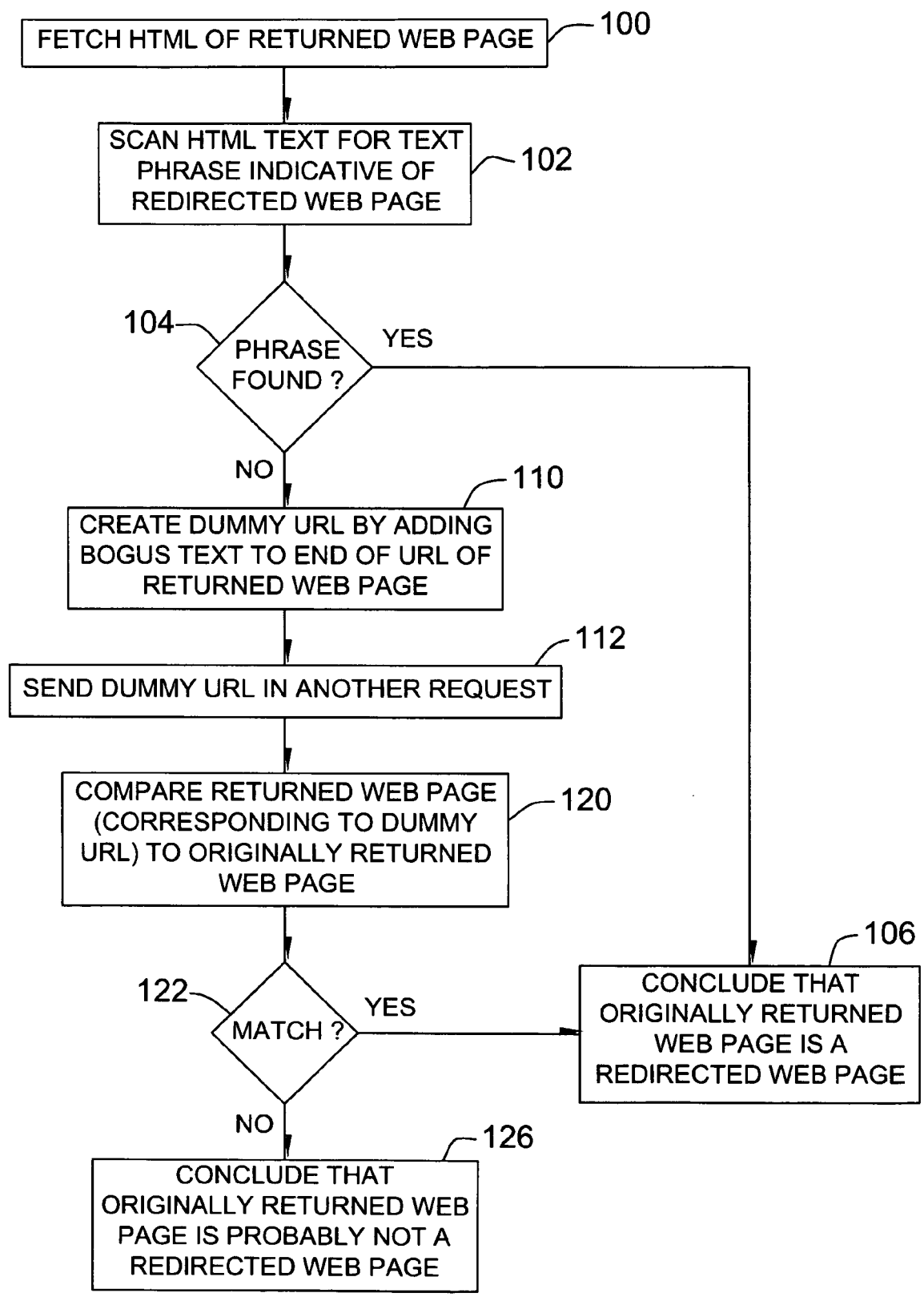
FIG. 4 is a flow chart of the web page analysis program of FIG. 3.

As noted above, program 13 determines whether the web page which is returned to the user is the one requested by the user or is instead redirected web page. FIG. 4 illustrates the web page analysis program 13 in more detail. In step 100, program 13 fetches the returned web page from memory or storage of workstation 10. Typically, the web page is in HTML form with text fields and image fields enclosed by respective symbols. Program 13 can be used to analyze all returned web pages or only those of concern. For example, the workstation 10 can execute a vulnerability scanning program tool 19. Tool 19 identifies several returned web pages as sensitive web pages which should not have been returned, i.e. security "holes". In such a case, program 13 can be invoked to test these returned web pages to determine whether they are the requested web pages, in which case they represent security "holes", or whether they are redirected web pages, in which case they do not represent security "holes".

Next, program 13 scans the text within the HTML for commonly used text phrases found on redirected web pages (step 102). For example, such text can be "page not found", "page does not exist", or "bad request". Program 13 obtains a list of such commonly used text phrases from a file 104 within RAM 16. If one of the text phrases stored in file 104 is found on the returned web page (decision 104, yes branch), then program 13 concludes that the returned web page is a redirected web page (step 106). However, if one of the text phrases stored in file 104 is not found (decision 104, no branch), then program 13 creates a "dummy" URL by adding a bogus text extension to the URL of the returned web page (step 110). The bogus text extension comprises text that is not likely to match any real application, such as "NoWayThisPageExists". (The actual character string is not important as long as it is not likely to match a real application.) For example, if the URL of the returned web page is "http://www.IBM.com", then the "dummy" URL can be "http://www.IBM.com/NoWayThisPageExists". Program 13 forwards the dummy URL to web browser 12 when it requests the corresponding web page. The same application which returned the web page will likely receive the dummy URL because the dummy URL has the same beginning as that of the returned web page. However, the application which returned the web page will not likely recognize the extension. Consequently, the application which returned the web page will redirect the request to a default application which handles improperly addressed URLs. This default application, which may be the same as the application which returned the web page, will return a redirected web page. Then, program 13 will compare the text and graphics in the redirected web page returned by the default application to the text and graphics in the web page returned earlier (step 120). If they are the same (decision 122, yes branch), then program 13 concludes that the web page returned earlier was a redirected web page (step 106). It should be noted that if the originally returned web page includes a graphical drawing of "Page Not Found" or a text phrase which is not included in file 106 but nevertheless indicates a redirection, this will not be detected in step 102, but will be detected in step 120. Referring again to decision 122, if no branch where the two web pages are not the same, then the program 13 concludes that the web page returned earlier was not a redirected web page (step 126). It is possible that there are two or more different redirected web pages for the originally specified application, and the dummy URL may return a different redirected web page than the redirected web page that was originally returned. In such a case, program 13 will conclude that the web page that was originally returned was not redirected, which is incorrect. Nevertheless, in most cases, there is only one redirected web page for each user-specified URL. So, when the web page that was originally returned does not match the one returned from the dummy URL, it is likely that the web page that was originally returned was the one requested by the user, and not a redirected web page. For those applications where the present invention is used to check whether unauthorized/sensitive web pages have been returned to a vulnerability checking tool, program 13 can identify as redirected (and therefore, not security violations) most of the web pages identified by the vulnerability checking tool as unauthorized security violations. So, the present invention will reduce the number of web pages that an operator will need to check manually.

Web page analysis program 13 can be loaded into workstation 10 from a computer storage medium such as magnetic disk, CD-ROM or DVD, or downloaded from the Internet 22 via TCP/IP interface 21.

Based on the foregoing, a system, method and program product have been disclosed for determining if a web page returned to a web browser is a redirected web page. However, numerous modifications and substitutions can be made without deviating from the scope of the present invention. Therefore, the present invention has been disclosed by way of illustration and not limitation, and reference should be made to the following claims to determine the scope of the present invention.

The invention claimed is:

1. A method for determining whether a first web page returned to a web browser is a redirected web page, said method comprising the steps of:
    creating a dummy URL by appending one or more characters to a URL of said first web page, said one or more characters being chosen such that said dummy URL is likely to elicit a redirected web page;
    sending a request for said dummy URL;
    receiving a second web page in response to said request;
    comparing content of said second web page to content of said first web page; and
    making a record indicating that said first web page is a redirected web page if the content of said second web page matches said content of said first web page.

2. A method as set forth in claim 1 further comprising the steps of:
    making a record indicating that said first web page was not determined to be a redirected web page if said content of said second web page does not match said content of said first web page.

3. A method as set forth in claim 1 wherein said one or more characters are chosen such that said dummy URL is not likely to match an application recognized by a same application that returned said second web page.

4. A method as set forth in claim 3 wherein the step of sending said request for said dummy URL comprises the step of sending said request for said dummy URL to a same application that returned said second web page.

5. A method as set forth in claim 1 wherein the comparing step comprises the step of comparing text of said second web page to text of said first web page.

6. A method as set forth in claim 5 wherein the comparing step further comprises the step of comparing graphics of said second web page to graphics of said first web page.

7. A method as set forth in claim 1 wherein the comparing step comprises the step of comparing graphics of said second web page to graphics of said first web page.

8. A method as set forth in claim 1 further comprising the step of:
    scanning content of said first web page for a text phrase indicative of a redirected web page.

9. A method as set forth in claim 8 wherein said text phrase indicative of a redirected web page includes "page not found" or the like.

10. A system for determining whether a first web page returned to a web browser is a redirected web page, said system comprising:
    a processor configured for;
    creating a dummy URL by appending one or more characters to a URL of said first web page, said one or more characters being chosen such that said dummy URL is likely to elicit a redirected web page;
    sending a request for said dummy URL;
    receiving a second web page in response to said request;
    comparing content of said second web page to content of said first web page; and
    making a record indicating that said first web page is a redirected web page if the content of said second web page matches said content of said first web page.

11. A system as set forth in claim 10 further comprising:
    wherein the processor is further configured for making a record indicating that said first web page was not determined to be a redirected web page if said content of said second web page does not match said content of said first web page.

12. A system as set forth in claim 10 wherein said one or more characters are chosen such that said dummy URL is not likely to match an application recognized by a same application that returned said second web page.

13. A system as set forth in claim 12 wherein the means for sending said request for said dummy URL comprises means for sending said request for said dummy URL to a same application that returned said second web page.

14. A system as set forth in claim 10 wherein the comparing means compares text of said second web page to text of said first web page.

15. A system as set forth in claim 14 wherein the comparing means also compares graphics of said second web page to graphics of said first web page.

16. A system as set forth in claim 10 further comprising:
    means for scanning content of said first web page for a text phrase indicative of a redirected web page.

17. A computer program product for determining whether a first web page returned to a web browser is a redirected web page, said computer program product comprising program instructions stored on a computer readable medium, the program instructions comprising:
    first program instructions to create a dummy URL by appending one or more characters to a URL of said first web page, said one or more characters being chosen such that said dummy URL is likely to elicit a redirected web page;
    second program instructions to initiate sending of a request for said dummy URL;
    third program instructions to fetch a second web page received in response to said request;
    fourth program instructions to compare content of said second web page to content of said first web page; and fifth program instructions to make a record indicating that said first web page is a redirected web page if the content of said second web page matches said content of said first web page.

18. A computer program product as set forth in claim 17, the program instructions further comprising:
sixth program instructions stored on the computer readable medium to make a record indicating that said first web page was not determined to be a redirected web page if said content of said second web page does not match said content of said first web page.

19. A computer program product as set forth in claim 17, the program instructions further comprising:
sixth program instructions stored on the computer readable medium to scan content of said first web page for a text phrase indicative of a redirected web page.

20. A computer program product as set forth in claim 19 wherein said text phrase indicative of a redirected web page includes "page not found".

* * * * *